United States Patent
Becker et al.

(10) Patent No.: US 11,231,122 B2
(45) Date of Patent: Jan. 25, 2022

(54) PRESSURE COMPENSATED SOLENOID VALVE WITH FLUID FLOW FORCE BALANCING

(71) Applicant: Schaeffler Technologies AG & Co, Herzogenaurach (DE)

(72) Inventors: David Becker, White Lake, MI (US); Stefan Konias, Erlangen (DE)

(73) Assignee: Schaeffler Technologies AG & Co, Herzogenaurach (DE)

( * ) Notice: Subject to any disclaimer, the term of this patent is extended or adjusted under 35 U.S.C. 154(b) by 296 days.

(21) Appl. No.: 16/286,661

(22) Filed: Feb. 27, 2019

(65) Prior Publication Data
US 2020/0271238 A1    Aug. 27, 2020

(51) Int. Cl.
*F16K 31/06* (2006.01)

(52) U.S. Cl.
CPC ....... *F16K 31/06* (2013.01); *Y10T 137/86614* (2015.04)

(58) Field of Classification Search
CPC .......... F16K 1/443; F16K 1/446; F16K 31/06; F16K 31/0606; F16K 31/0603; F16K 31/061; F16K 31/0613; F16K 31/02; F16K 31/0693; F16K 31/0627; F16K 17/048; F16K 11/044; F16K 15/026; F16K 15/08; Y10T 137/88022; Y10T 137/8803; Y10T 137/88038; Y10T 137/86622; Y10T 137/86614; Y10T 137/8667; Y10T 137/86694; Y10T 137/8671; Y10T 137/86702; Y10T 137/86791; Y10T 137/86799; G05D 16/202; G05D 16/2022; G05D 16/2024; G05D 16/2033; G05D 16/2093; F01L 13/00; F01L 13/0005; F01L 1/34; F01L 2820/033; F01L 2013/105; F01L 2013/106; F02D 13/0203; F02M 2025/0845
USPC ....... 137/614.16–614.18; 251/129.01–129.22
See application file for complete search history.

(56) References Cited

U.S. PATENT DOCUMENTS

| | | | | |
|---|---|---|---|---|
| 2,392,741 A * | 1/1946 | Hurlburt | ............... | F16K 31/408 |
| | | | | 137/630.22 |
| 3,963,049 A * | 6/1976 | Beauregard | ............ | F16K 25/00 |
| | | | | 137/614.18 |
| 4,526,340 A * | 7/1985 | Kolchinsky | ............... | H01F 7/16 |
| | | | | 251/38 |
| 6,047,718 A * | 4/2000 | Konsky | ................... | F16K 1/443 |
| | | | | 137/1 |
| 6,572,077 B1 * | 6/2003 | Worner | ................... | F16K 1/443 |
| | | | | 251/129.18 |
| 6,701,959 B1 | 3/2004 | Flynn et al. | | |

(Continued)

*Primary Examiner* — Craig J Price
(74) *Attorney, Agent, or Firm* — Matthew Evans

(57) ABSTRACT

A pressure compensated solenoid valve with fluid flow force balancing is provided. The solenoid valve includes an armature and a valve plunger arranged to transport hydraulic fluid from a supply end of a valve plunger to an upper end of the armature facilitating a resultant upper fluid force that acts upon the upper end of the armature to balance a resultant lower fluid force that acts on the supply end of the valve plunger. The solenoid valve includes a poppet that is configured as a pressure-relief valve for maintaining a minimum fluid pressure within an actuation fluid gallery. An inlet fluid force of the poppet is balanced by an outlet fluid force of the poppet.

20 Claims, 4 Drawing Sheets

(56) References Cited

U.S. PATENT DOCUMENTS

| | | | |
|---|---|---|---|
| 7,011,110 B1 * | 3/2006 | Stark | F16K 1/44 |
| | | | 137/601.14 |
| 8,056,576 B2 | 11/2011 | Van Weelden | |
| 8,333,362 B2 | 12/2012 | Busato et al. | |
| 9,903,280 B2 * | 2/2018 | Layne | F16K 31/0627 |
| 10,119,628 B1 | 11/2018 | Becker | |
| 2006/0249210 A1 | 11/2006 | Van Weelden | |
| 2007/0039655 A1 * | 2/2007 | Kim | G05D 16/2024 |
| | | | 137/625.65 |
| 2016/0230678 A1 * | 8/2016 | Layne | F02D 13/0203 |

* cited by examiner

PRESSURE COMPENSATED SOLENOID VALVE WITH FLUID FLOW FORCE BALANCING

TECHNICAL FIELD

Example aspects described herein relate to solenoid valves, and, more particularly, to solenoid valves used in variable valve lift or variable valve timing systems of internal combustion engines for automobiles.

BACKGROUND

Variable valve lift (VVL) and variable valve timing (VVT) systems of internal combustion (IC) engines often manage hydraulic fluid flow, leakage or pressure within a network of fluid galleries to vary the output of these respective systems. This type of hydraulic fluid management is typically handled by a solenoid valve which can be precisely controlled by an electronic controller such as an engine control unit (ECU). A solenoid valve that consistently functions throughout the varying operating conditions of the IC engine is critical to the accuracy and performance of many VVL and VVT systems.

SUMMARY OF THE INVENTION

A pressure compensated solenoid valve with fluid flow force balancing is provided. The solenoid valve includes a central axis, a bobbin configured to support a coil, a pole, a containment tube, an armature, a valve plunger, and a poppet. The coil is configured to produce a magnetic field when energized with electric current. At least a portion of the pole is circumferentially surrounded by the bobbin; at least a portion of the containment tube is circumferentially surrounded by the pole; and, at least a portion of the armature is circumferentially surrounded by the containment tube. The armature is configured to be axially displaceable by the magnetic field. The valve plunger is axially displaceable within the valve housing to a first seated position or a second non-seated position. The first seated position can correspond with a de-energized state of the coil, and the second non-seated position can correspond with an energized state of the coil. In an example embodiment, while in the first seated position, an actuation port of the solenoid valve is not fluidly connected to a fluid supply port of the solenoid valve, and while in the second non-seated position, the actuation port of the solenoid valve is fluidly connected to the fluid supply port of the solenoid valve.

The poppet is arranged to be axially displaceable within the valve housing to a first closed position or a second pressure-relief position. The poppet is biased to the first closed position by a poppet bias spring. In the first closed position, the poppet can engage an upper landing surface of the valve plunger. In the second pressure-relief position, the poppet can be configured to fluidly connect an actuation port of the solenoid valve to a tank port of the solenoid valve.

At least a portion of the valve plunger can extend through a through-passage of the poppet. The valve plunger can be configured with a first fluid flow passage and the armature can be configured with a second fluid flow path that is fluidly connected to the first flow path. The first and second fluid flow paths can be arranged to transport hydraulic fluid from a supply end of the valve plunger to an upper end of the armature such that a resultant upper fluid force acting on the upper end of the armature is balanced by a resultant lower fluid force acting on the supply end of the valve plunger.

The poppet is arranged with a first surface at a first end and a second surface at a second end, the first and second surfaces are configured to equalize, respectively, an inlet fluid force acting on the poppet with an exiting fluid force acting on the poppet, with the poppet in the second pressure-relief position. The poppet bias spring and at least a portion of the first surface can cooperate to define a cracking pressure of the poppet. The poppet can be configured with a lower spring well to receive at least a portion of the poppet bias spring.

The poppet can be configured to be engaged at a first angled end by an inlet fluid that produces an inlet fluid force, and at a second angled end by an exiting fluid producing an exiting fluid force; the poppet can be balanced by the incoming fluid force and the exiting fluid force while in the second pressure-relief position.

The first surface of the poppet and the upper landing surface of the valve plunger can form a fluid access gap that is configured to receive a fluid; the poppet can be configured to be axially displaceable by the fluid within the fluid access gap.

The upper landing surface of the valve plunger can define a third angled surface having a third angle. The first surface of the poppet can define a first angled surface having a first angle, and the first angle can be different than the third angle. The first angled surface and the third angled surface can form a fluid access gap.

In an example embodiment, the solenoid valve can further include an armature bias spring arranged between the armature and the containment tube, with the armature bias spring urging the valve plunger to the first seated position. At least a portion of the armature bias spring can be received by a spring bore arranged on an upper end of the armature.

In an example embodiment, the solenoid valve can further include a sealing collar that is arranged within the valve housing, and at least a portion of the valve plunger can extend through the sealing collar. The sealing collar can be configured as a longitudinal stop for the poppet in the second pressure-relief position. Furthermore, the sealing collar can be configured with an upper spring well that receives at least a portion of the poppet bias spring.

In an example embodiment the valve plunger can include a fluid aperture configured to fluidly connect a fluid supply port of the solenoid valve to an actuation port of the solenoid valve while in the first seated position or the second non-seated position.

BRIEF DESCRIPTION OF DRAWINGS

The above mentioned and other features and advantages of the embodiments described herein, and the manner of attaining them, will become apparent and be better understood by reference to the following descriptions of multiple example embodiments in conjunction with the accompanying drawings. A brief description of the drawings now follows.

DETAILED DESCRIPTION OF THE INVENTION

Figure 1:
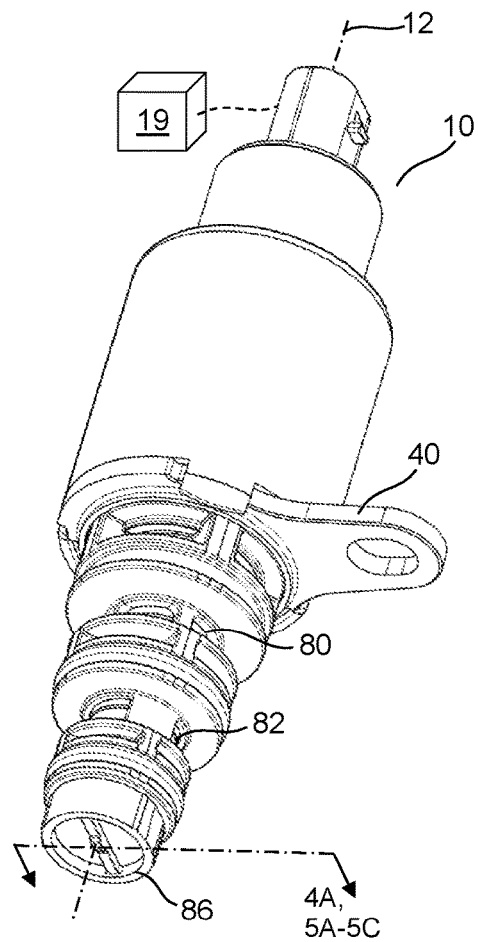
FIG. 1 is a perspective view of an example embodiment of a pressure-compensated solenoid valve with fluid flow force balancing, together with an electronic controller.

Identically labeled elements appearing in different figures refer to the same elements but may not be referenced in the description for all figures. The exemplification set out herein illustrates embodiments which should not be construed as limiting the scope of the claims in any manner. A radially inward direction is from an outer radial surface, toward the central axis or radial center of the component. Conversely, a radial outward direction indicates the direction from the central axis or radial center of the component toward the outer surface. Axially refers to directions along a diametric central axis. The words "upper", "lower", "upward", "downward", "above" and "below" designate directions in the drawings to which reference was made.

Figure 2A:
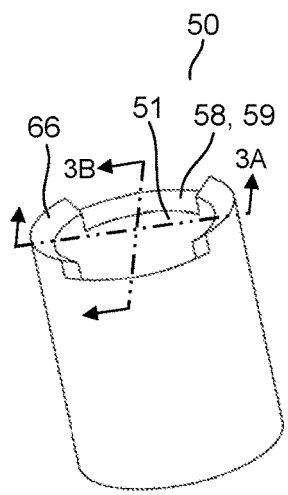
FIG. 2A is a first perspective view of an example embodiment of a flow-balanced poppet.
Figure 2B:
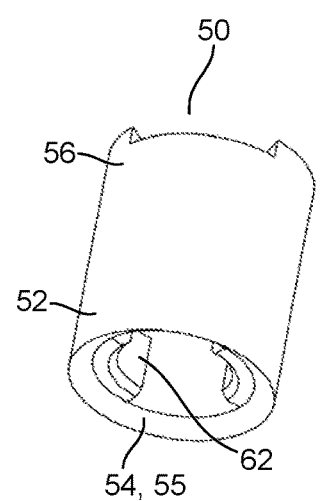
FIG. 2B is a second perspective view of the poppet shown in FIG. 2A.
Figure 3A:
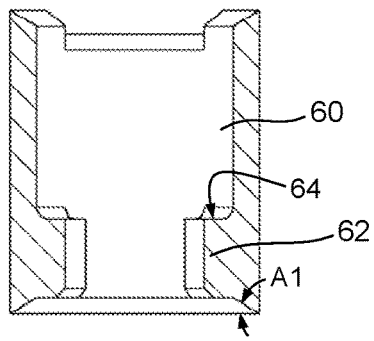
FIG. 3A is a first cross-sectional view taken from FIG. 2A.
Figure 3B:
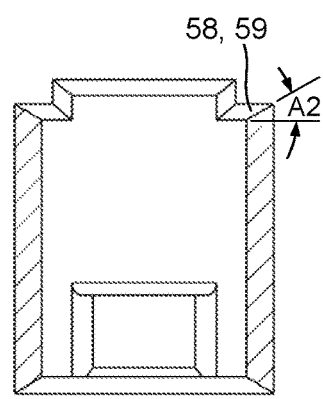
FIG. 3B is a second cross-sectional view taken from FIG. 2A.
Figure 4A:
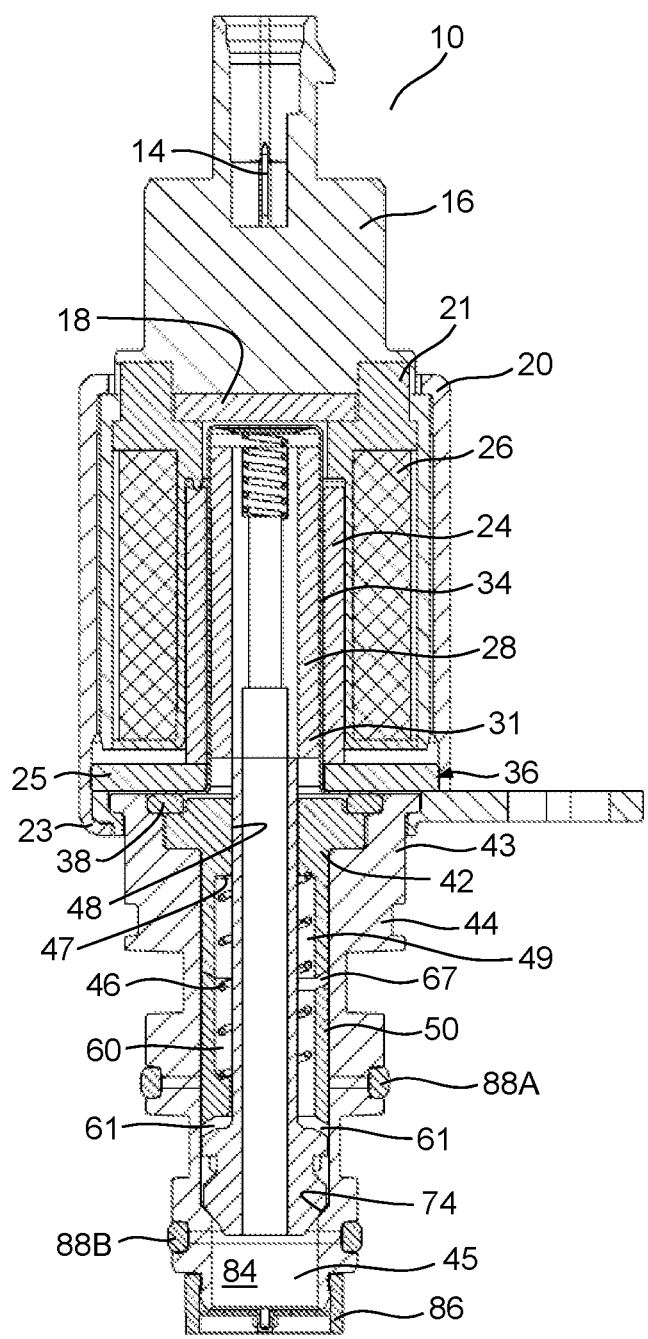
FIG. 4A is a cross-sectional view of the solenoid valve of FIG. 1.
Figure 4B:
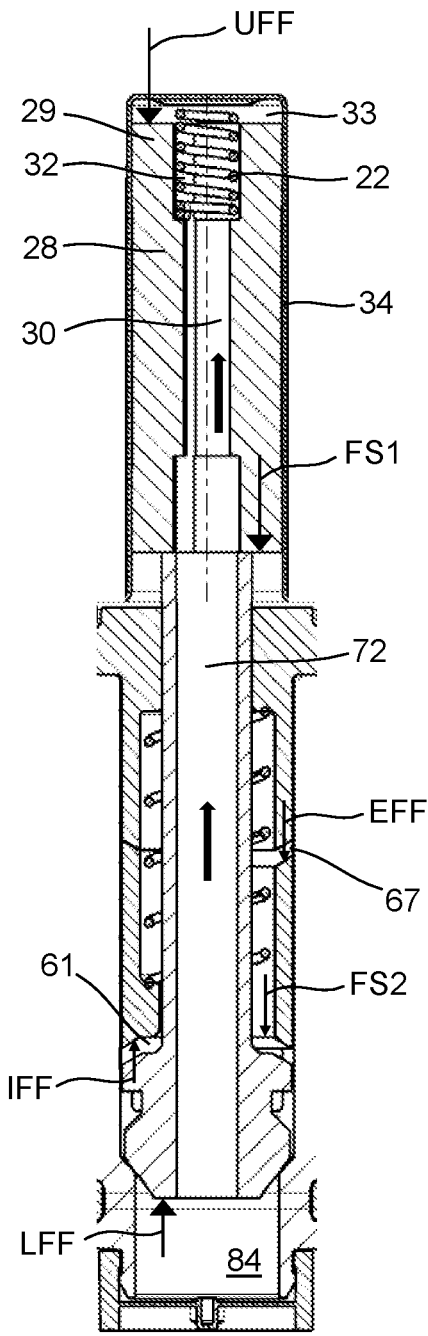
FIG. 4B is a detailed view taken from FIG. 4A.
Figure 5C:
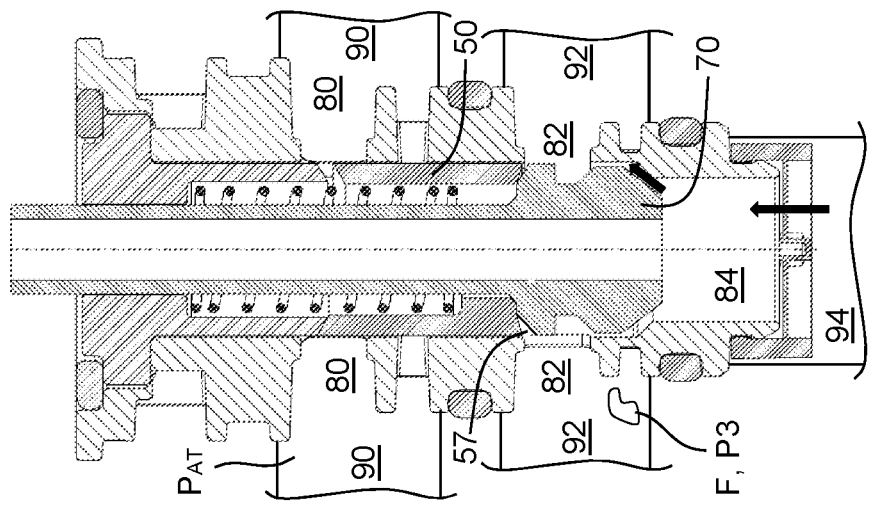
FIG. 5C is a partial cross-sectional view of the solenoid valve of FIG. 1, showing a second non-seated position of the valve plunger.
Figure 5B:
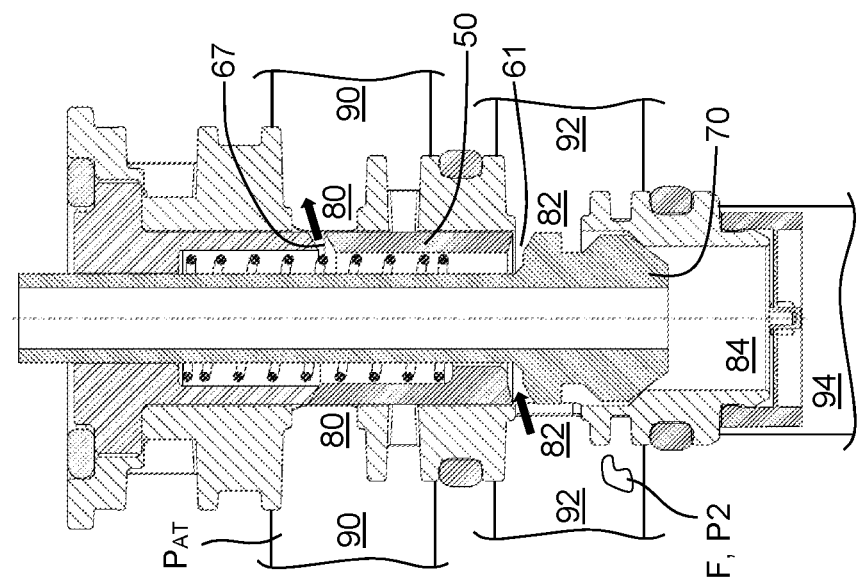
FIG. 5B is a partial cross-sectional view of the solenoid valve of FIG. 1, showing a first seated position of the valve plunger and a second pressure-relief position of the poppet.
Figure 5A:
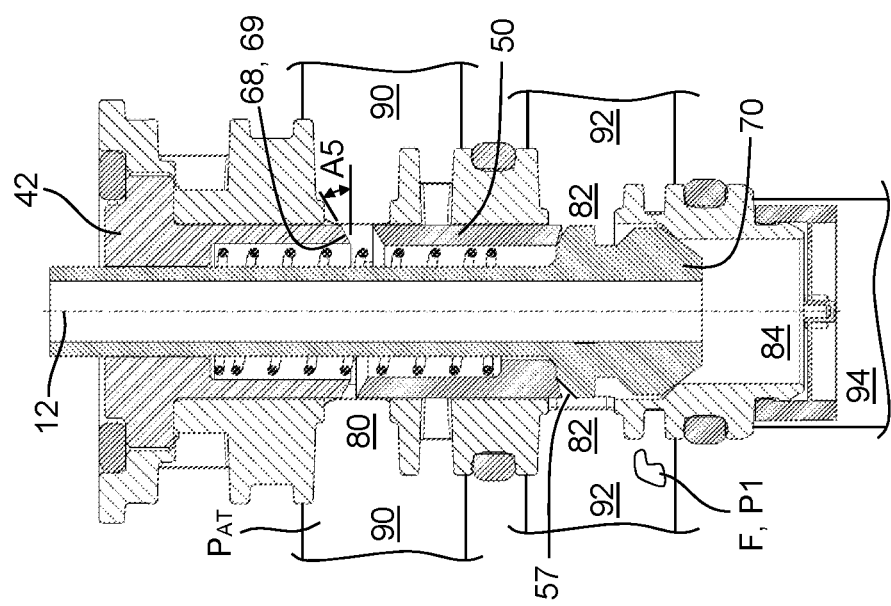
FIG. 5A is a partial cross-sectional view of the solenoid valve of FIG. 1, showing a first seated position of a valve plunger and a first closed position of the poppet.
Figure 6:
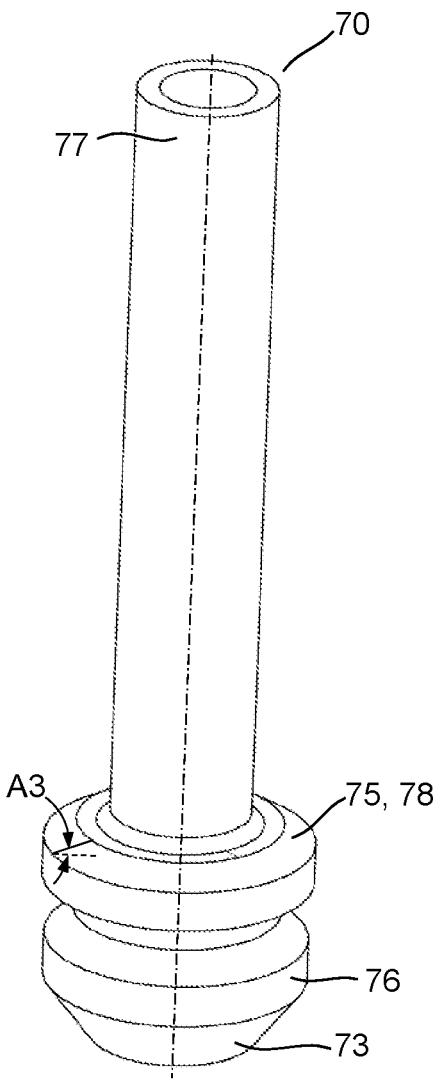
FIG. 6 is a perspective view of an example embodiment of a valve plunger.

Referring to FIG. 1, a perspective view of an example embodiment of a pressure compensated solenoid valve 10 with fluid flow force balancing is shown. FIGS. 2A and 2B show perspective views of an example embodiment of a flow-balanced poppet 50 that is arranged within the solenoid valve 10 of FIG. 1. FIGS. 3A and 3B show cross-sectional views taken from the poppet 50 of FIG. 2A. FIG. 4A shows a cross-sectional view taken from the solenoid valve 10 of FIG. 1. FIG. 4B shows an enlarged cross-sectional view taken from the cross-sectional view of FIG. 4A, showing upper and lower fluid forces UFF, LFF acting on an armature 28 and a valve plunger 70, respectively; and, inlet and exiting flow forces IFF, EFF acting on first and second respective ends 52, 56 of the poppet 50. FIGS. 5A through 5C show different positions of the valve plunger 70 and poppet 50 and corresponding fluid gallery connections. FIG. 6 shows a perspective view of an example embodiment of a valve plunger 70 for the solenoid valve 10 of FIG. 1. The following discussion should be read in light of FIGS. 1 through 6.

Figure 7:
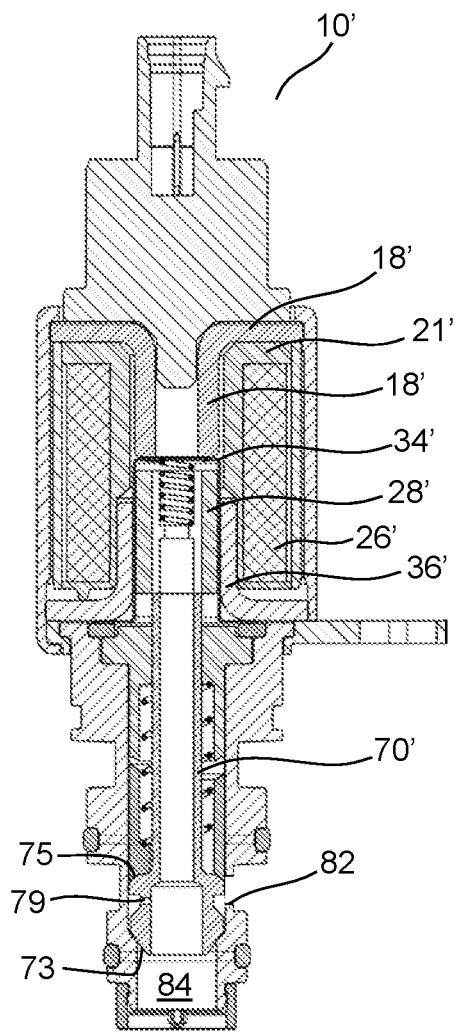
FIG. 7 is a cross-sectional view of an example embodiment of a pressure-compensated solenoid valve with fluid flow force balancing.

The solenoid valve 10 includes a central axis 12, and a bobbin 21 that radially houses and supports a coil 26. A yoke 18 is arranged at a top portion of the bobbin 21. The coil 26 becomes energized when it receives electric current via an electric terminal 14. The control and selective delivery of the electric current is managed by an electronic controller 19 that powers the solenoid valve 10. The electric terminal 14 is housed by a plastic overmold 16. The presence of electric current in the coil 26 induces a magnetic field which causes the armature 28 to move axially downward within a containment tube 34 that circumferentially surrounds the armature 28. The containment tube 34, or at least a portion thereof, is circumferentially surrounded by a pole 36. The pole 36 includes an upper pole tube 24 and a lower pole ring 25, however, a one-piece design is also possible, as shown in FIG. 7. The pole 36, or at least a portion thereof, is circumferentially surrounded by the bobbin 21. A lower end 31 of the armature 28 engages with an upper end 77 of the valve plunger 70. A coupling (not shown) may be added that connects the armature 28 to the valve plunger 70. The valve plunger 70 is axially displaceable within a valve housing 44. A solenoid housing 20 circumferentially surrounds the coil 26 with a bottom end 23 of the solenoid housing 20 securing a mounting tab 40 to a solenoid end 43 of the valve housing 44. A supply end 76 of the valve plunger 70 is configured with a lower seating surface 73 that can engage or abut with a receiving land 74 formed within a central aperture 45 of the valve housing 44. A portion of the valve plunger 70 extends through a clearance aperture 48 of a sealing collar 42, with the sealing collar 42 arranged at a solenoid end 43 of the valve housing 44 and forming an exit fluid passage with the poppet 50. The sealing collar 42 includes an upper spring well 49 that receives a poppet bias spring 46, the upper spring well 49 including an upper spring land 47 to receive a top end of the poppet bias spring 46. Other design configurations for the valve plunger 70, sealing collar 42, and their associated interfaces, are possible.

A coil-de-energized state can yield a first seated position of the valve plunger 70, as shown in FIGS. 4A and 4B. In the first seated position, an armature return spring 22 urges the armature 28 in a downward direction with a first biasing force FS1 such that the lower seating surface 73 of valve plunger 70 is forcibly engaged with the receiving land 74 of the valve housing 44. This first seated position of the valve plunger 70 prevents a fluid connection between a fluid supply port 84 and an actuation port 82 of the solenoid valve 10. The armature return spring 22 is received within an armature spring well 32 located at an upper end 29 of the armature 28, however, any location of the armature return spring 22 or any other force generator, for that matter, is possible, to provide a seating force on the armature 28.

A coil-energized state can yield a second non-seated position of the valve plunger 70, as shown in FIG. 5C. In this second non-seated position, a magnetic field created by the coil 26 overcomes the first biasing force FS1 of the armature return spring 22 and moves the armature 28 and valve plunger 70 upward, facilitating a fluid connection between the fluid supply port 84 and the actuation port 82 of the solenoid valve 10. This actuation arrangement of the solenoid valve 10 could also be described as a "pull-type" design, where energization of the coil 26 creates a magnetic field that pulls the armature 28 and valve plunger 70 upward.

For many state of the art solenoid valves, a switching time of the solenoid valve can vary with a changing hydraulic fluid supply pressure. Switching time can encompass the time it takes for an electronic signal to reach the solenoid valve in addition to the time it takes to move an armature and corresponding valve component (after receiving the electronic signal) to change an operating state of the solenoid valve. Many applications, especially those in internal combustion engines, require consistent switching times while operating throughout a varying range of operating parameters and conditions. One such operating condition variable is hydraulic fluid supply pressure that typically interfaces with a solenoid valve component that is actuated to change the operating state of the solenoid valve. Hydraulic fluid supply pressure can be a function of hydraulic fluid viscosity and temperature, along with hydraulic fluid pump speed. For an internal combustion engine that operates within a wide temperature and engine speed range, significant supply pressure variation effects are possible. Referring to FIGS. 4A and 4B, the pressure-compensated solenoid valve 10 provides internal pressure compensation by permitting hydraulic fluid to flow through the valve plunger 70 and armature 28 in an upward direction, providing an upper fluid force UFF to counteract an inherent lower fluid force LFF that acts on the supply end 76 of the valve plunger 70 within the fluid supply port 84. The upper fluid force UFF is facilitated by: 1) a first fluid flow path 72 arranged within the valve plunger 70; 2) a second fluid flow path 30 arranged within the armature 28 which is fluidly connected to the first fluid flow path 72; and, 3) the containment tube 34 which encompasses the armature, forming a fluid cavity 33 between the containment tube 34 and an upper end 29 of the armature 28. The containment tube 34 can be sealed by an axial seal 38.

The solenoid valve 10 described herein and captured in the Figures can provide at least two basic functions. These two functions will be described with an assumption that the solenoid valve 10 is utilized within a variable valve train system capable of switching between two discrete valve lift modes; however, the solenoid valve 10 is also capable of being used in other types of systems. With this variable valve train system example in mind, and view to FIGS. 5A-5C, the two functions include: 1) enabling and disabling fluid connection between a pressurized fluid supply gallery 94 and an actuation fluid gallery 92; and, 2) maintaining a minimum hydraulic fluid pressure Pmin within the actuation fluid gallery 92 during a time when the fluid supply gallery 94 is not fluidly connected to the actuation fluid gallery 92. The minimum hydraulic fluid pressure Pmin typically ranges from 0.1 to 0.7 bar, however, a higher minimum hydraulic fluid pressure Pmin is also possible. Function number two is needed to ensure that the actuation fluid gallery 92 is full of hydraulic fluid, as a full gallery of oil (with minimum air content) minimizes a time for communication of pressurized hydraulic fluid to a receiving switchable valve train component. An example of this type of variable valve train is captured within U.S. Pat. No. 9,790,820, the entire contents of which are incorporated herein by reference.

Referring to FIGS. 2A through 6, the poppet 50 and its functional attributes will now be described. The poppet 50 can be utilized to maintain the previously described desired minimum hydraulic fluid pressure Pmin within the actuation fluid gallery 92 that is fluidly connected to the actuation port 82 of the solenoid valve 10. Maintaining the desired minimum hydraulic fluid pressure Pmin is accomplished by the poppet 50 serving as a pressure relief valve for the actuation fluid gallery 92, with the poppet 50 having a first closed position, and a second open or pressure-relief position.

Referring to FIG. 5A, the valve plunger 70 is shown in a first seated position, and the poppet 50 is shown in the first closed position. In the first seated position of the valve plunger 70, a fluid supply gallery 94 is not fluidly connected to an actuation fluid gallery 92. In the first closed position of the poppet 50, the actuation fluid gallery 92 is not fluidly connected to a tank gallery 90. The following discussion describes pertinent features of these components relative to the previously described functions of the solenoid valve 10.

The poppet 50 includes a through-passage 51, a first surface 54 at a first end 52, and a second surface 58 at a second end 56. A portion of the valve plunger 70 extends through the through-passage 51. A bias spring retainer 62 is arranged within the through-passage 51; a lower spring land 64 of the bias spring retainer 62 receives a bottom end of a poppet bias spring 46, with a portion of the poppet bias spring 46 disposed with a lower spring well 60 of the poppet 50. The first surface 54, or at least a portion thereof, together with the upper landing surface 75 of the valve plunger 70 form a fluid access gap 57 that can be accessed by hydraulic fluid when the poppet 50 is in the first closed position. The fluid access gap 57, does not have to be a 360-degree circumferential gap, as shown in the Figures; the fluid access gap 57 could be one or more segments of circumferential gaps, such that the one or more segments are less than 360 degrees. The first surface 54 of the poppet 50 can define a first angled surface 55 having a first angle A1; and, the upper landing surface 75 of the valve plunger 70 can define a third angled surface 78 having a third angle A3. The first angle A1 can be different than the third angle A3 to form the fluid access gap 57. In FIG. 5A, the actuation fluid gallery 92 contains a fluid F with a first fluid pressure P1 that is less than or equal to the desired minimum hydraulic fluid pressure Pmin.

Now referring to FIG. 5B, the valve plunger 70 remains in its first seated position as in FIG. 5A, however the poppet 50 is shown in the second pressure-relief position, displaced upward by the hydraulic fluid F having a second fluid pressure P2 that is greater than the desired minimum hydraulic fluid pressure Pmin of the actuation fluid gallery 92. Initial upward displacement of the poppet 50 occurs when an inlet fluid force IFF, a product of a second fluid pressure P2 within the actuation fluid gallery 92 and an area of a portion of the first surface 54 that is exposed within the fluid access gap 57, exceeds a second biasing force FS2 provided by the poppet bias spring 46. Therefore, the second pressure-relief position can be any longitudinal position of the poppet at which the first surface 54 of the poppet is separated from the upper landing surface 75 of the valve plunger 70. FIG. 5B shows the poppet 50 at its upper-most stop position achieved when a fourth surface 66 of the poppet 50 abuts with a fifth surface 68 of the sealing collar 42. The second biasing force FS2 and the area of the portion of the first surface 54 that is exposed within the fluid access gap 57 should be designed such that the poppet moves upward when the second fluid pressure P2 exceeds the desired minimum hydraulic fluid pressure Pmin of the actuation fluid gallery 92. Stated otherwise, the second biasing force FS2 and the area of the portion of the first surface 54 that is exposed within the fluid access gap 57 define a cracking pressure of the poppet 50. With the poppet 50 in the second pressure relief position, the actuation fluid gallery 92 is fluidly connected to the tank gallery 90 which has a pressure at or near atmospheric pressure PAT, facilitating a flow of the hydraulic fluid F from the actuation fluid gallery 92 to the tank gallery 90.

Figure 8A:
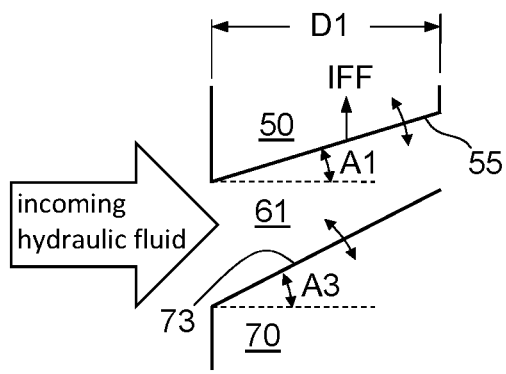
FIG. 8A is a schematic of a fluid inlet passage between the poppet and valve plunger shown in FIG. 5B.
Figure 8B:
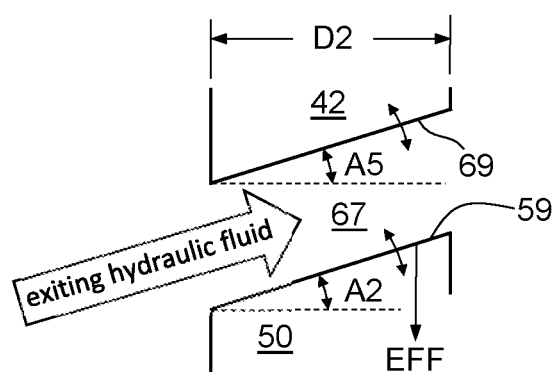
FIG. 8B is a schematic of a fluid exit passage between the poppet and valve plunger shown in FIG. 5B.

The poppet 50 accomplishes the pressure-relief or minimum pressure maintaining task while incorporating features that provide fluid force balancing of the poppet 50. The second surface 58 of the poppet 50, together with the fifth surface 68 of the sealing collar 42 form a fluid exit passage 67 that exits hydraulic fluid to the tank port 80. The second surface 58 can define a second angled surface 59 having a second angle A2; and, the fifth surface 68 can define a fifth angled surface 69 having a fifth angle A5. The previously described fluid access gap 57 shown in FIG. 5A becomes a fluid inlet passage 61 upon upward displacement of the poppet 50, as shown in FIG. 5B, to allow fluid to flow inside of the poppet 50. Now referring to FIGS. 8A and 8B, fluid force balancing of the poppet 50 can be accomplished by adjustment of one or both of the fluid inlet passage 61 and the fluid exit passage 67, such that the inlet fluid force IFF is balanced by the exit fluid force EFF. The fluid access gap 57, and, thus, the resulting inlet fluid force IFF, can be adjusted by changing the third angle A3 of the third angled surface 78 of the valve plunger 70 or by changing the first angle A1 of the first angled surface 55 of the poppet 50. The fluid exit passage 67, and, thus, the resulting exit fluid force EFF, can be adjusted by changing the second angle A2 of the second angled surface 59 or by changing the fifth angle A5 of the fifth angled surface 69. All of the angles can be made larger or smaller, as shown in FIGS. 8A and 8B. In addition, the flow area can be made bigger or smaller by adjusting the depths D1, D2 of the fluid inlet passage 61 and the fluid exit passage 67, respectively. All of the aforementioned adjustments can be made to control: 1) a fluid pressure differential between the fluid inlet passage 61 and fluid exit passage 67 (or stated otherwise, a pressure drop across the poppet 50); and, 2) a fluid velocity of incoming hydraulic fluid and exiting hydraulic fluid. Both these parameters (pressure differential/drop and fluid velocity) effect the magnitude of the inlet fluid force IFF and the exit fluid force EFF, and, thus, each of these parameters can be tuned to achieve a balanced poppet 50. Without a balanced poppet 50 balanced by inlet and exit fluid forces, or, stated otherwise, without a poppet 50 that does not have a balancing exit fluid force EFF to counteract the inherent inlet fluid force IFF, the inlet fluid force IFF will contribute towards "de-seating" the valve plunger 70 while it is in the first seated position. Such a de-seating force can potentially lead to intermittent fluid communication of the fluid supply gallery 94 to the actuation fluid gallery 92 while the solenoid valve 10 is functioning within a vibrating component, such as an internal combustion engine. Therefore, the solenoid valve 10 can achieve a fluidly balanced condition while the valve plunger 70 is in the first seated position, and the poppet 50 at either of the first closed or second pressure-relief positions.

Referring to FIG. 5C, the second non-seated position of the valve plunger 70 is shown in which the fluid supply gallery 94 is fluidly connected to the actuation fluid gallery 92. In this state of the solenoid valve, a third fluid pressure P3 of the hydraulic fluid F, higher than the second pressure P2, is present in the actuation fluid gallery 92. The third fluid pressure P3 can be capable of actuating a component, such as a switchable valve train component. With the valve plunger 70 in the second non-seated position, the poppet 50 is moved to its longitudinal stop position against the sealing collar 42, however, the fluid inlet passage 61 is closed due to the second non-seated position of the valve plunger 70, preventing fluid communication between the actuation fluid gallery 92 and the tank gallery 90.

The exterior of the valve housing 44 can include radial seals, such as upper and lower seals 88A, 88B. These seals 88A, 88B and additional seals can provide sealing isolation for the various ports arranged on the valve housing 44. An optional filter 86 is arranged on the fluid supply port 84 of the valve housing 44. A filter could also be placed on the actuation port 82.

Referring to FIG. 7, a cross-sectional view of another example embodiment of a pressure compensated solenoid valve 10' with fluid flow force balancing is shown. The solenoid valve 10' includes a yoke 18', a bobbin 21' that houses a coil 26', an armature 28' that moves longitudinally within a containment tube 34', a one-piece pole 36', and a valve plunger 70' that moves longitudinally within the valve housing 44 to achieve the previously described first seated and second non-seated positions. The valve plunger 70' includes a fluid aperture 79 arranged between the upper landing surface 75 and the lower seating surface 73. The fluid aperture 79 fluidly connects the fluid supply port 84 to the actuation port 82 of the solenoid valve 10' while in either of the first seated or second non-seated positions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What we claim is:

1. A solenoid valve comprising:
   a central axis;
   a bobbin configured to support a coil; the coil configured to produce a magnetic field when energized with electric current;
   a pole, at least a portion circumferentially surrounded by the bobbin;
   a containment tube, at least a portion circumferentially surrounded by the pole;
   an armature configured to be axially displaceable by the magnetic field, at least a portion of the armature circumferentially surrounded by the containment tube;
   a valve plunger, axially displaceable within a valve housing to a first seated position or a second non-seated position;
   a poppet arranged to be axially displaceable within the valve housing to a first closed position or a second pressure-relief position, the poppet biased to the first closed position by a poppet bias spring such that the poppet engages the valve plunger; and,
   the poppet arranged with a first surface at a first end and a second surface at a second end, the first and second surfaces configured to equalize, respectively, an inlet fluid force acting on the poppet with an exiting fluid force acting on the poppet, with the poppet in the second pressure-relief position.

2. The solenoid valve of claim 1, wherein at least a portion of the valve plunger extends through a through-passage of the poppet.

3. The solenoid valve of claim 1, wherein the valve plunger is configured with a first fluid flow path and the armature is configured with a second fluid flow path fluidly connected to the first fluid flow path, the first and second fluid flow paths arranged to transport hydraulic fluid from a supply end of the valve plunger to an upper end of the armature, wherein a resultant upper fluid force acting on the upper end of the armature is balanced by a resultant lower fluid force acting on the supply end of the valve plunger.

4. The solenoid valve of claim 3, further comprising an armature bias spring arranged between the armature and the containment tube, the armature bias spring urging the valve plunger to the first seated position.

5. The solenoid valve of claim 4, wherein at least a portion of the armature bias spring is received by a spring bore arranged on an upper end of the armature.

6. The solenoid valve of claim 1, wherein the first seated position of the valve plunger corresponds with a de-energized state of the coil, and the second non-seated position of the valve plunger corresponds with an energized state of the coil.

7. The solenoid valve of claim 1, wherein in the first seated position, an actuation port of the solenoid valve is not fluidly connected to a fluid supply port of the solenoid valve, and in the second non-seated position, the actuation port of the solenoid valve is fluidly connected to the fluid supply port of the solenoid valve.

8. The solenoid valve of claim 1, wherein in the first closed position of the poppet, the poppet engages an upper landing surface of the valve plunger.

9. The solenoid valve of claim 8, wherein the first surface and the upper landing surface form a fluid access gap, the fluid access gap configured to receive a fluid.

10. The solenoid valve of claim 9, wherein the poppet is configured to be axially displaceable by the fluid within the fluid access gap.

11. The solenoid valve of claim 8, wherein the upper landing surface defines a third angled surface having a third angle.

12. The solenoid valve of claim 11, wherein the first surface of the poppet defines a first angled surface having a first angle, the first angle different than the third angle, the first angled surface and the third angled surface a forming a fluid access gap.

13. The solenoid valve of claim 1, further comprising a sealing collar arranged within the valve housing, at least a portion of the valve plunger extending through the sealing collar, wherein the sealing collar forms a fluid exit passage with the poppet.

14. The solenoid valve of claim 13, wherein the sealing collar is configured as a longitudinal stop for the poppet in the second pressure-relief position.

15. The solenoid valve of claim 13, wherein the sealing collar is configured with an upper spring well that receives at least a portion of the poppet bias spring.

16. The solenoid valve of claim 1, wherein the poppet bias spring and at least a portion of the first surface cooperate to define a cracking pressure of the poppet.

17. The solenoid valve of claim 1, wherein the second pressure-relief position of the poppet is configured to fluidly connect an actuation port of the solenoid valve to a tank port of the solenoid valve.

18. The solenoid valve of claim 1, wherein the poppet is configured with a lower spring well to receive at least a portion of the poppet bias spring.

19. The solenoid valve of claim 1, wherein the valve plunger includes a fluid aperture configured to fluidly connect a fluid supply port of the solenoid valve to an actuation port of the solenoid valve while in the first seated position or the second non-seated position.

20. A solenoid valve comprising:
a central axis;
a bobbin configured to support a coil; the coil configured to produce a magnetic field when energized with electric current;
a pole, at least a portion circumferentially surrounded by the bobbin;
a containment tube, at least a portion circumferentially surrounded by the pole;
an armature configured to be axially displaceable by the magnetic field, at least a portion circumferentially surrounded by the containment tube;
a valve plunger, axially displaceable within a valve housing to a first seated position or a second non-seated position;
a poppet arranged to be axially displaceable within the valve housing to a first closed position or a second pressure-relief position, the poppet biased to the first closed position by a poppet bias spring; and,
the poppet configured to be engaged at a first angled end by an inlet fluid producing an inlet fluid force, and at a second angled end by an exiting fluid producing an exiting fluid force, the poppet balanced by the inlet fluid force and the exiting fluid force in the second pressure-relief position.

* * * * *